United States Patent
Jensen et al.

(10) Patent No.: US 8,494,773 B2
(45) Date of Patent: *Jul. 23, 2013

(54) ENVIRONMENTAL SENSING AND COMMUNICATION

(75) Inventors: Thomas P. Jensen, Eagle, ID (US); Casimir E. Lawler, Jr., Boise, ID (US); James Hatchett, Eagle, ID (US); Wayne K. Debord, Indianapolis, IN (US); Michael L. Byce, Boise, ID (US)

(73) Assignee: PakSense, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,827

(22) Filed: Mar. 16, 2012

(65) Prior Publication Data

US 2012/0179374 A1 Jul. 12, 2012

Related U.S. Application Data

(63) Continuation of application No. 12/255,295, filed on Oct. 21, 2008, now Pat. No. 8,224,576.

(51) Int. Cl.
*G01V 7/00* (2006.01)
*G06F 17/40* (2006.01)

(52) U.S. Cl.
USPC ............... 702/2; 702/116; 702/122; 702/123; 702/187; 702/188

(58) Field of Classification Search
USPC .............................. 702/2, 116–123, 187, 188
See application file for complete search history.

(56) References Cited

U.S. PATENT DOCUMENTS

| | | | |
|---|---|---|---|
| 7,002,470 B1 * | 2/2006 | Miao | 340/539.22 |
| 7,057,495 B2 | 6/2006 | Debord et al. | |
| 7,248,147 B2 | 7/2007 | Debord et al. | |
| 2004/0090326 A1 | 5/2004 | Chin et al. | |
| 2006/0084848 A1 * | 4/2006 | Mitchnick | 600/301 |
| 2006/0139200 A1 | 6/2006 | Jensen | |
| 2006/0180661 A1 | 8/2006 | Grant et al. | |
| 2007/0195808 A1 * | 8/2007 | Ehrlich et al. | 370/408 |
| 2007/0203650 A1 * | 8/2007 | Jensen et al. | 702/3 |

(Continued)

FOREIGN PATENT DOCUMENTS

GB 2342998 A 4/2000

OTHER PUBLICATIONS

Harvestmark, "HarvestMark Technology". http://harvestmark.com/technology/. Accessed Jul. 21, 2008 (3 pp.).

(Continued)

*Primary Examiner* — Phuong Huynh
(74) *Attorney, Agent, or Firm* — Brooks, Cameron & Huebsch, PLLC (57) ABSTRACT

One apparatus embodiment includes an electronic assembly, equipped to sense one or more changes in an environmental condition. The assembly includes a logic circuit coupled to: one or more environmental sensors, memory that provides data storage, and a wireless communicator. The logic circuit is configured to perform time measurement, perform environmental measurement with the one or more environmental sensors, store time-stamped environmental data in the memory, and communicate with particular other electronic assemblies, equipped to sense one or more changes in an environmental condition, via the wireless communicator. The logic circuit is also coupled to a power source that provides power to at least one of the logic circuit and the wireless communicator.

26 Claims, 4 Drawing Sheets

U.S. PATENT DOCUMENTS

2007/0205258 A1  9/2007  Self et al.
2007/0215685 A1  9/2007  Self et al.
2007/0290869 A1  12/2007  Debord et al.
2007/0297613 A1* 12/2007  Ghosh .......................... 380/277
2008/0011841 A1  1/2008  Self et al.

OTHER PUBLICATIONS

International Search Report and Written Opinion for related PCT Application No. PCT/US2009/005725 dated May 17, 2010 (12 pp.).

* cited by examiner

Fig. 2

Fig. 3

ENVIRONMENTAL SENSING AND COMMUNICATION

PRIORITY APPLICATION INFORMATION

This application is a Continuation of U.S. application Ser. No. 12/255,295, filed Oct. 21, 2008, the specification of which is incorporated herein by reference.

BACKGROUND

Embodiments of the present disclosure relate generally to sensing environmental conditions and communicating sensed information in order to inform users as to conditions that exist that may affect items that are in the area of the sensor.

Producers, distributors, warehousers, and quality personnel, among others, especially those in charge of perishable, spoilable, or high-value items that are, for example, moving through a logistics supply chain, may desire to know the condition of items for which their operation is accountable. Also, the customer perception of quality may be of value in some industries and, therefore, the monitoring of products through the supply chain may be used to indicate such quality to a customer base.

Further, some entities may be interested in lowering insurance premium costs and the monitoring of products through the supply chain may be one way to reduce such costs. Monitoring the environment of products as they travel is a way of gaining such efficiencies, increasing traceability, and/or of providing for the quality and safety of products which can influence one or more of the above factors, among other benefits.

A number of environmental sensing assemblies have been taught, for example, in U.S. Pat. No. 7,057,495 "Perishable Product Electronic Label Including Time and Temperature Measurement" and U.S. Pat. No. 7,248,147 "Perishable Product Electronic Label Including Time and Temperature Measurement", and U.S. patent application Ser. No. 11/712,075 "Environmental Sensing", all of which are commonly assigned and have at least one common inventor with the present application. One or more embodiments of the present disclosure may improve upon these and other devices, systems, and methods for environmental sensing and communication, in some instances.

DETAILED DESCRIPTION

The present disclosure describes a number of device, system, and method embodiments. For example, some embodiments include an electronic assembly, equipped to sense one or more changes in an environmental condition. In various embodiments, the assembly includes a logic circuit coupled to: an environmental sensor, memory that provides data storage, and a wireless communicator.

The logic circuit can, for example, be configured to perform time measurement, perform environmental measurement with the environmental sensor, store time-stamped environmental data in the memory, and/or communicate with particular other electronic assemblies equipped to sense one or more changes in an environmental condition (e.g., via the wireless communicator). The logic circuit is also coupled to a power source that provides power to at least one of the logic circuit and the wireless communicator.

In one or more embodiments, the logic circuit can be configured to communicate time-stamped environmental data with the particular other electronic assemblies and/or to a remote reader device (e.g., via the wireless communicator). An electronic assembly (e.g., an environmental sensing assembly) can sense and/or store environmental data and/or communicate that data to other assemblies. Accordingly, in various embodiments, an environmental sensing assembly can receive environmental data transmitted by another assembly.

In some embodiments, after an environmental sensing assembly communicates time-stamped environmental data to a remote reader device, a logic circuit associated with the assembly can enter a sleep mode. In sleep mode, the logic circuit can, for example, still be powered at a reduced setting, but not execute instructions and/or communicate via the wireless communicator, in order to preserve the life of a power source, among other benefits.

As used herein, "particular other" electronic assemblies can include those electronic assemblies within communication range of the wireless communicator for a particular time, as will be discussed in more detail below. In one or more embodiments, the wireless communicator can, for example, have a communication range greater than 1000 feet. An example of a suitable wireless communicator can be a radio frequency (RF) transceiver, such as the CC 1100 available from Texas Instruments, among other types of wireless communicators.

In one or more embodiments, an environmental sensing assembly can have an associated assembly identifier. In some instances, the assembly identifier can be the same as a serial number associated with the assembly, although other identifiers can be used and/or assigned. The logic circuit in an electronic assembly can use the wireless communicator to transmit and/or receive assembly identifiers. Such embodiments can be useful to let the logic circuit "know" which other assemblies it is communicating with. This can be beneficial, for example, in grouping data from multiple electronic assemblies.

In some embodiments, a logic circuit can receive time-stamped environmental data transmitted along with an assembly identifier from a number of other environmental sensing assemblies (e.g., the particular other assemblies). In some such embodiments, the logic circuit can append an assembly group identifier to the assembly identifier and store the received time-stamped environmental data along with the appended assembly identifiers and, thereby, associating the data into a group. This can aid in allowing more robust data analysis based on multiple assemblies.

For example, an environmental sensing assembly, having identifier 0, could receive data from three other assemblies having identifiers 1, 2, and 3. Assembly 0 could append a group assembly identifier X to the assembly identifiers and store data along with the appended identifiers, such as 0X, 1X, 2X, and 3X. Such embodiments can be useful for determining which assembly is associated with certain stored data and to which other sensor the data is related.

Environmental data can include temperature, humidity, physical orientation, proximity, acceleration, pressure, molecular compounds, chemical change, shock, vibration, light, as well as other environmental data and combinations thereof. Accordingly, an environmental sensing assembly can include one or more sensors for one or more types of environmental data.

One method of environmental sensing and communication provides including a group of environmental sensing assemblies in an environment for sensing, activating the group, and collecting environmental data with the group. Information can be wirelessly communicated between two or more of the environmental sensing assemblies of the group. Such information can include timing information, environmental sensing assembly identifiers, as well as environmental data collected by one or more other environmental sensing assemblies.

In some embodiments, one of the environmental assemblies can be assigned as a leader for the group. Environmental data collected by an environmental sensing assembly can be communicated with and stored in memory of the leader. In some instances, a corresponding environmental sensing assembly identifier for an assembly can be communicated with and stored with the environmental data from the assembly. As described herein, a group identifier can be appended to the assembly identifiers for each assembly in the group.

The leader can be assigned in various manners such as randomly assigning one assembly as the leader, assigning a leader based on which assembly identifier meets one or more particular criteria with respect to other assembly identifiers, and/or assigning a leader based on which assembly has been active for the greatest and/or least amount of time, among other suitable selection processes. Examples of particular criteria with respect to assembly identifiers can include criteria such as an alphanumerically greatest and/or least identifier, a shortest and/or longest identifier, and/or other criteria.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated to provide a number of additional embodiments of the present disclosure. In addition, as will be appreciated the proportion and the relative scale of the elements provided in the figures are intended to illustrate the embodiments of the present disclosure, and should not be taken in a limiting sense.

Figure 1:
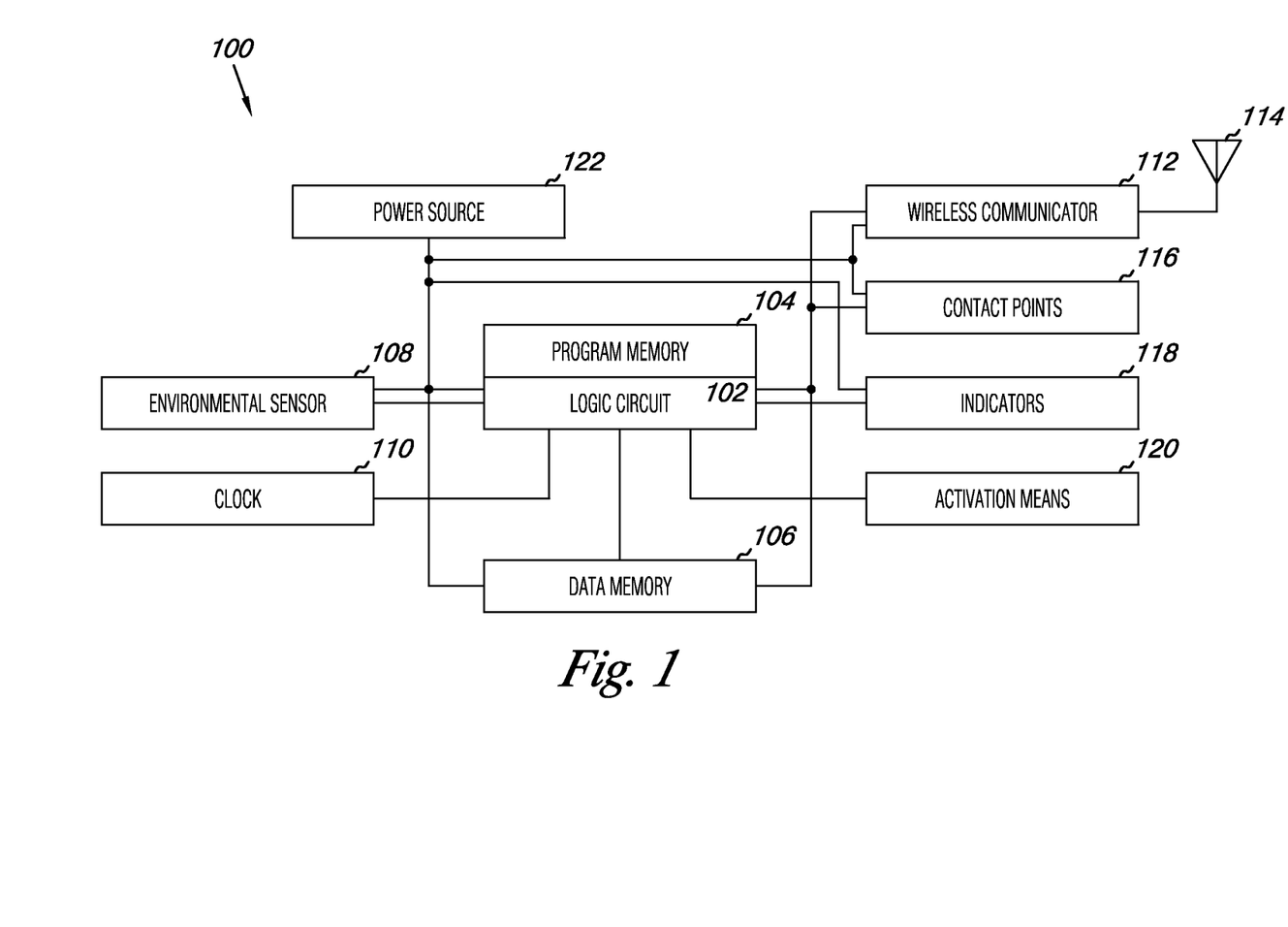
FIG. 1 is a block diagram of a circuit according to one or more embodiments of the present disclosure.

FIG. 1 is a block diagram of a circuit according to one or more embodiments of the present disclosure. The circuit illustrated in FIG. 1 can be associated with an environmental sensing assembly 100. The terms "environmental sensing assembly" and "electronic assembly" may be used interchangeably herein. In some instances, an "environmental sensing assembly" or "electronic assembly" may be referred to as an "assembly" for sake of brevity.

Embodiments of the present disclosure can be utilized to provide a simple to use, low-cost, accurate, disposable, and/or re-usable device(s) as an element of a monitoring system. Assembly embodiments, for example, can be a tag, label, or an assembly that is built into a package, among other suitable embodiments for monitoring environmental conditions.

One or more embodiments may include a logic circuit 102 such as a controller, a microprocessor, a micro-controller, an application specific integrated circuit (ASIC), or the like. The logic circuit 102 may be interfaced with a program memory 104 configured to provide storage of a set of computer executable instructions in the form of software, firmware, and/or hardware that at least partially provides functionality. Thus, the functionality described with respect to various software-based embodiments is also applicable to hardware-based embodiments, and conversely.

The interfaced program memory 104 and/or data memory 106 may be implemented as one of, or a combination of, volatile and non-volatile memory, such as random access memory ("RAM"), EEPROM, Flash memory, or the like. It is also within the purview of the present disclosure that the memory may be included in the logic circuit 102 and/or program and data memory may be provided together in a single memory source or may be provided together on multiple sources.

In some embodiments, the logic circuit 102 can be coupled to data memory 106. In one or more embodiments, data memory 106 can store data that is accumulated by the assembly 100, such as time and/or environmental condition data or a combination thereof (e.g., time-stamped environmental data). In some embodiments, this information can be provided to a database via a reader device (e.g., a remote reader device) that is not contained within the assembly 100 (e.g., a database on a server with a web portal for access by a number of clients).

Embodiments of the present disclosure can utilize memory compression techniques that allow a device to store more information. For example, a number of methods for memory compression associated with environmental sensing assemblies are described in U.S. patent application Ser. No. 11/712,075, entitled "Environmental Sensing," to Thomas Jensen, et al. Such compression techniques are not described in more detail herein so as not to obscure embodiments of the present disclosure.

In various embodiments, the logic circuit 102 can be coupled to one or more environmental sensors 108. In some embodiments, executable instructions can be provided that are executable by a logic circuit 102 to take an environmental measurement at a predetermined time interval. In various embodiments, executable instructions can be provided that are executable by the logic circuit 102 to take an average of a number of such environmental measurements. These averages can, for example, be calculated through use of a number of sets of environmental measurements. Such embodiments can be useful to help reduce power consumption by operation of one or more sensors and/or to help reduce consumption of available storage space in memory, among other benefits.

The logic circuit 102 can be coupled to a clock 110. It is also within the purview of the present disclosure that the clock 110 may be included in the logic circuit 102. The clock 110 can be used by the logic circuit to perform time measurement, among other functions.

The logic circuit 102 can be coupled to a wireless communicator 112. The wireless communicator 112 can include an infrared and/or radio frequency modulation circuit, in some embodiments.

The wireless communicator 112 can be coupled to an antenna 114. Some purposes of the hardware described herein, for example, can be to provide mechanisms for sensing environmental variables, performing storage of measured data, performing processing of the measured data (e.g., under embedded software control), communicating environmental data, providing display indications, and/or providing download and/or offload capability of processed data.

The logic circuit 102 can be coupled to one or more physical contact points 116. Physical contact points 116 can be suitable for contacting with an external probe device, for example a reader device, and can be located within the assembly or can be positioned for contact with or without penetration into the assembly, in various embodiments.

Physical contact points 116 can be used for electrical communication between the assembly 100 and another device, such as a reader device. In one or more embodiments, one or more of the contact points 116 can be coupled to power source 122 to provide power to the power source 122 from, for example, a reader device. Such embodiments can be useful in recharging and/or supplementing the power source 122.

The logic circuit 102 can be coupled to one or more indicators 118. For example, the indicators 118 can, in some embodiments, include a number of indicating Light Emitting Diodes (LEDs) that can be visible from an exterior of the assembly 100.

Such indicators 118 can, for example, be arranged to indicate an upper, a middle, and a lower light as indicators 118. In such a configuration, the upper indicator can serve as an over limit status indicator, the lower indicator as an under limit status indicator, and the center indicator can serve as an OK status indicator. As discussed herein, other types of display indicators 118 can be used in various embodiments and the indicators can be any suitable indicating mechanism.

Various embodiments can utilize a chemical change to provide a portion of or the entire indicator 118 functionality of the assembly 100. For example, an electro-chemical component can be used to provide at least some indicator 118 functionality, in some embodiments.

The logic circuit 102 can be configured to initiate an alarm status when a calculated alarm event occurs based upon measured time and environmental data and/or received environmental data (e.g., from other environmental sensing assemblies). The alarm status, for example, can be signaled by indicators 118 (e.g., by illuminating, flashing, other otherwise operating LEDs, among other processes). A calculated alarm event can occur, for example, when environmental data exceeds a particular range (e.g., when a temperature rises above a certain threshold), among other alert events.

In some embodiments, an alarm status can be transmitted by wireless communicator 112 and/or by physical contact points 116 to another environmental sensing assembly and/or to a reader device. Whether transmitted by wireless communicator 112, physical contact points 116, or indicated by indicators 118, an alarm status can be beneficial in alerting users to particular environmental conditions that may require attention.

The logic circuit 102 can be coupled to an activation mechanism 120. Activation mechanism 120 can be provided by a number of possible circuits and constructions, including ones that include a breakaway tab switch, a pull-tab switch, an infrared switch, a magnetic switch, an electromagnetic switch, a radio frequency resonant switch, or a pushbutton momentary switch, among other mechanism types. For example, with respect to a pushbutton momentary switch or a pull-tab switch, activation can be accomplished by a user physically activating the circuit. In some embodiments, a transmitting device (e.g., wireless communicator 112) can be used to remotely accomplish the activation (e.g., by one or more radio frequency (RF) signals).

As stated above, the environmental sensing assembly 100 can include a power source 122 coupled to a number of components of the assembly 100, such as the logic circuit 102, environmental sensor 108, wireless communicator 112, physical contact points 116, and indicators 118, among others. In some embodiments, the power source 122 can be a coin-cell type power source. In one or more embodiments, the power source 122 can be a rechargeable battery power source.

Figure 2:
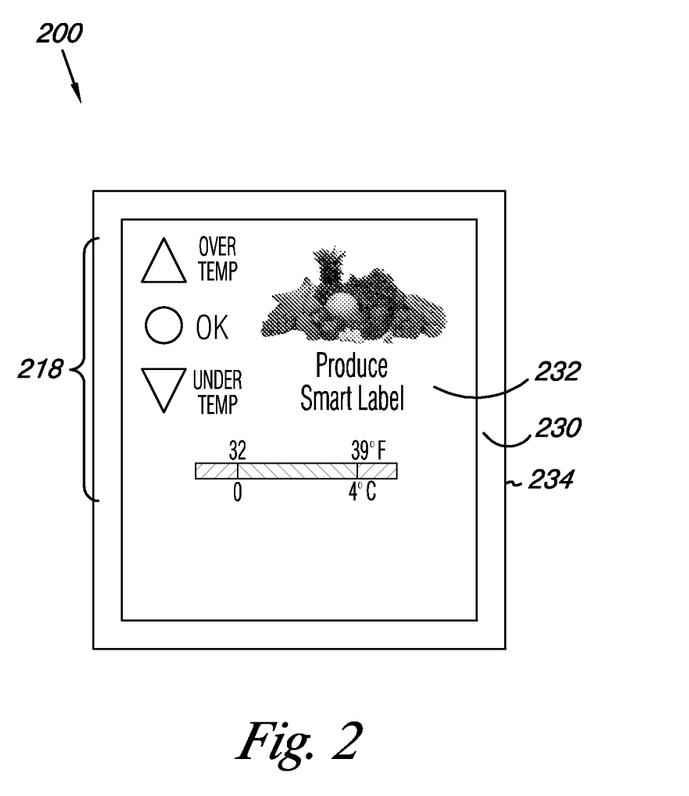
FIG. 2 is a top view of a labeled circuit assembly according to one or more embodiments of the present disclosure.

FIG. 2 is a top view of a labeled circuit assembly according to one or more embodiments of the present disclosure. In one or more embodiments, the environmental sensing assembly 200 can include a protective cover 230 at least partially surrounding the assembly (e.g., including the environmental sensor, memory, wireless communicator, logic circuit, and power source, among other components). In various embodiments, the pouch 234 can be as small as or smaller than about 8.0 centimeters by 5.5 centimeters by 0.2 centimeters.

In some embodiments, the cover 230 can be made larger such that it can be folded to cover both the front and the back of the environmental sensing assembly 200. In various embodiments, an area of the cover 230 can be printed with legend information (e.g., text and/or symbols) that identifies what the one or more indicators 218 signify.

In some embodiments, a graphic label 232 can be constructed (e.g., from plastic and/or paper film, etc.). The label 232 can be fabricated from any suitable material including translucent or opaque materials and can be provided as a clear or semi-clear material with overprinting thereon, in some embodiments. In some embodiments, the graphic label 232 can include printed features on its surface.

Some embodiments utilize a transparent, semi-transparent, or opaque pouch 234 that forms an outer layer over the environmental sensing assembly 200 (e.g., including the protective cover 230 and graphic label 232 if so equipped). The pouch 234 can be of any suitable material and can be sealed permanently or resealably in any suitable manner.

For instance the pouch 234 can be heat-sealed, glued, or have a physical sealing structure formed from the pouch material. Examples, of such materials include, but are not limited to materials including plastics, vinyls, polystyrenes, and other such materials. For instance, polyethylene terephthalate (PET) is one suitable plastic material for use with food.

Such pouches 234 can be designed to meet industry standards, such as food safety standards. As defined herein a food safety standard can be any standard created by an entity (e.g., the U.S. Food and Drug Administration) to regulate usage with food. In this way, if the pouch 234 is sealed, the pouch 234 may be approved for use (e.g., as safe for placement adjacent to food) while the contents do not have to be approved.

In some embodiments, the exterior of the pouch can meet such a requirement, while the interior may or may not meet a requirement. This case can save significant time and money since the manufacturer does not have to gain approval of the assembly 200 to be placed within the pouch 234, in some instances, among other benefits.

In embodiments that utilize one or more illuminating indicators 218, such as LEDs, the indicators can illuminate printed lenses, for example, from behind or from the side. The legend information associated with the indicators (e.g., "over temp," "OK," "under temp" as illustrated in FIG. 2), can be modified to suit programmed measurement and/or alert parameters.

Embodiments can also include other graphic elements such as a logo, target product identification area, an activation break point graphic, and/or a temperature limit graphic, among others. The logo and target product identification area, as well as the temperature limit graphic can be used, for example, to supply a package, tag, or label with a unique graphic that is matched to the parameters that are programmed into a logic circuit's program memory and/or data memory.

In various embodiments, the tag or label device may also be inserted into a packaging material. Various packaging and manufacturing methods are described in more detail in U.S. patent application Ser. No. 11/712,075, entitled "Environmental Sensing," by Thomas Jensen, et al.

Figure 3:
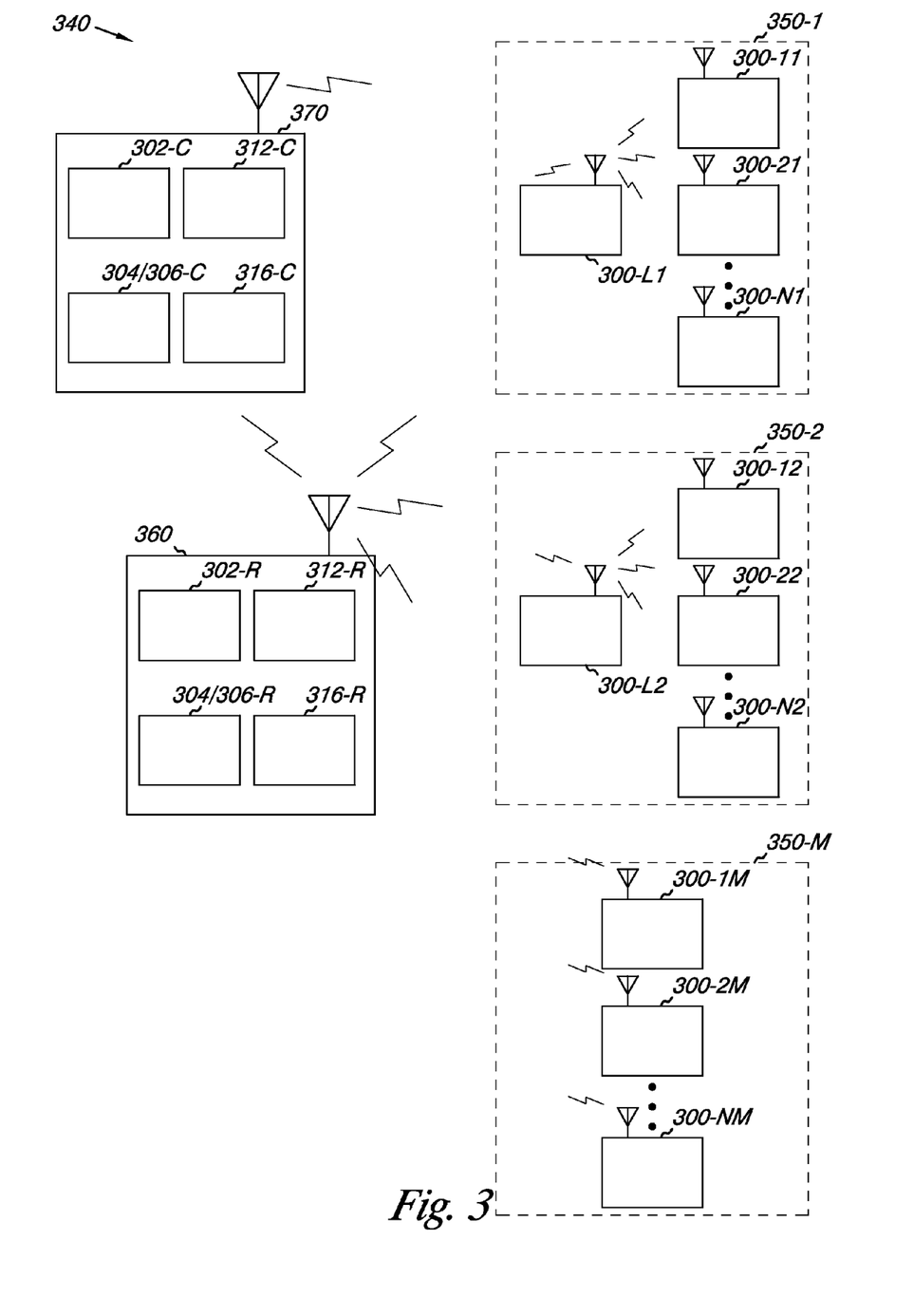
FIG. 3 is a block diagram illustrating an environmental sensing system according to one or more embodiments of the present disclosure.

FIG. 3 is a block diagram illustrating an environmental sensing system according to one or more embodiments of the present disclosure. The system 340 can include a number of electronic assemblies (e.g., environmental sensing assemblies). In some instances, the system 340 can include a number of groups of environmental sensing assemblies. For example, group 350-1 includes assemblies 300-11, 300-21, . . . 300-N1, and 300-L1; group 350-2 includes assemblies 300-12, 300-22, . . . , 300-N2, and 300-L2; and group 350-M includes assemblies 300-1M, 300-2M, . . . , 300-NM.

As used herein, the designators "N" and "M," particularly with respect to reference numerals in the drawings, indicate that a number of the particular feature so designated can be included with one or more embodiments of the present disclosure. For example, 300-N1 indicates that a number of environmental sensing assemblies can be included in the group. As used herein the designator "L" indicates that the assembly as been assigned as a leader for the group to which it belongs.

As discussed above, the environmental sensing assemblies can include a logic circuit coupled to an environmental sensor and a wireless communicator. The logic circuit can be encoded with an assembly identifier, as described herein, and can be configured to measure time and/or environmental data, periodically transmit time-stamped environmental data via the wireless communicator along with the assembly identifier, and determine a group to include those electronic assemblies from which transmissions are received during a period of time.

In some embodiments, the period of time can be specified and hard coded into one or more environmental sensing assemblies. In various embodiments, the period of time can be factory and/or user programmable.

One of the electronic assemblies in a group can be assigned as a leader for the group. As illustrated in FIG. 3, assembly 300-L1 has been assigned as the leader for group 350-1 and assembly 300-L2 has been assigned as the leader of group 350-2. Embodiments are not limited to groups having an assigned leader, as illustrated by group 350-M, which does not have an assigned leader.

A logic circuit of an environmental sensing assembly can be configured to store time-stamped environmental data in memory. When assigned as the leader of a group, the logic circuit of an environmental sensing assembly can store time-stamped environmental data along with assembly identifiers received from one or more of the other electronic assemblies of the group. In some embodiments, the leader can append a group identifier to the received assembly identifiers to indicate both a group and an assembly that corresponds to stored and/or transmitted environmental data.

The leader (e.g., leader 300-L2) can communicate environmental data and/or assembly/group identifiers for one or more assemblies in the group (e.g., assemblies 300-12, 300-22, . . . 300-N2, and 300-L2) to a remote reader device 360. For groups that do not have an assigned leader (e.g., group 350-M), one or more environmental sensing assemblies of the group (e.g., assemblies 300-1M, 300-2M, . . . , 300-NM) can communicate time-stamped environmental data and assembly identifiers to the remote reader device 360.

The system 340 can also include one or more remote reader devices 360. The remote reader device 360 can include a logic circuit 302-R, program and/or data memory 304/306-R, a wireless communicator 312-R, and a physical contact point (e.g., a physical contact port) 316-R. As used herein the designator "R" indicates a component associated with the remote reader device 360.

A remote reader device 360 can include a microcontroller as the logic circuit 302-R. The microcontroller can include internal memory storing executable instructions, and/or interface with program and/or data memory 304/306-R. Instructions can be executed to transmit a download request signal (e.g., to one or more environmental sensing assemblies). In response, an environmental sensing assembly, or a leader of a group of environmental sensing assemblies, can transmit time-stamped environmental data along with assembly identifiers to the remote reader device 360. In some instances, the assembly identifiers can be appended assembly identifiers, particularly when being transmitted by a leader of a group.

The remote reader device 360 can store the received data and identifiers in its internal memory 304/306-R. In some instances, the time-stamped environmental data can be segregated for each group according to the appended assembly identifiers.

In some embodiments, the remote reader device 360 can be configured to communicate data with an environmental sensing assembly and/or a computing device 370 using one or more of the wireless communicator 312-R and/or the physical contact point (e.g., physical communication port) 316-R. For example, the physical communication port 316-R can be a USB port with an associated driver, among other types of communications linking mechanisms.

The remote reader device 360 can be configured to wirelessly download data from one or more assemblies and/or groups of electronic assemblies via the wireless communicator 312-R. For example, the remote reader device 360 can communicate with a leader to download data for the entire group and/or communicate with each assembly in the group individually. Some wireless embodiments of an assembly and reader can be usable at short range and/or at long range. For example, some such embodiments can utilize portable device communication formats (e.g., GSM, ANSI, etc.) to communication information to and/or from the assembly.

These communication mechanisms can be based upon established standards, such as IEEE 802.11, or based upon other radio communication technologies. The wireless mechanisms associated with the environmental sensing assembly may also participate in a networked (e.g., mesh network) or similar interface scheme to communicate with the remote reader device. These types of networks may fall within IEEE 802.15.4 standards development, 13 MHz, or UHF forms of Radio-Frequency Identification (RFID), among others.

A physical contact point 316-R associated with a remote reader device 360 can also receive communications (e.g., time-stamped environmental data) from an environmental sensing assembly (e.g., assembly 300-1M). The communication functionality described herein, with the exception of specific wireless and/or physical capabilities (e.g., the wireless communicator can communicate wirelessly, while the physical contact point can allow for communication via physical contact), can generally be accomplished via either or both of the wireless communicator and/or physical contact points and should not be limited to either.

For example, the remote reader device 360 can be brought into physical contact with an environmental sensing assembly (e.g., assembly 300-1M) via the physical contact point 316-R to communicate with the same. Some embodiments can be useful to allow communications with an assembly that does not include wireless capabilities (e.g., embodiments of the present disclosure can be "backward compatible), or to communicate with assemblies that have lost wireless capability (e.g., due to malfunction, a dead power source, etc.).

Furthermore, the logic circuit (e.g., logic circuit 102 illustrated in FIG. 1) of an environmental sensing assembly (e.g., assembly 300-1M) can be configured to communicate an alarm status, as described herein, to a remote reader device 360 via the respective wireless communicators (e.g., wireless communicator 312 associated with the remote reader device and a wireless communicator associated with the assembly).

In one or more embodiments, the wireless communicator 302-R of the remote reader device 360 and the wireless communicators of the environmental sensing assemblies (e.g., assembly 300-1M) can be configured to provide a seamless link layer protocol of communication. The remote reader device 360 and the logic circuit of the environmental sensing assemblies can include communication algorithms to operate their respective wireless communicators using forward error correction, re-transmission capability, channel hopping based on clear channel assessment, and/or spread spectrum transmission.

In one or more embodiments, spread spectrum transmission can include frequency-hopping spread spectrum and/or direct-sequence spread spectrum. Frequency-hopping spread spectrum can include switching among multiple frequency channels such that a number of assemblies communicate on a particular channel at a particular time, and then on another channel at another time. Direct-sequence spread spectrum can allow sharing of a single channel among multiple different assemblies communicating at substantially the same time.

In some embodiments, communication algorithms can include the use of channel hopping based on clear channel assessment. That is, a number of assemblies can communicate on a particular channel at a particular time, and then switch to another channel when the other channel does is not communicating other traffic. The use of these, and other suitable communication algorithms, can aid in establishing and/or maintaining substantially interference-free communications, among other benefits.

Wireless communication links can be in any suitable format. For example, an electro-magnetic (EM) communicator can be employed in a remote reader device 360 to form a communication link to send a pulse or series of pulses to an EM receiver via an antenna (e.g., a coil type antenna) thereby utilizing an EM channel.

The transmitting and/or receiving functionality of a communicator can be provided by one or more transmitters, receivers, and/or transceivers. Although described generally as EM and/or RF transmitters and/or receivers, it is to be understood that any suitable wireless and/or wired communication mechanisms can be utilized in various embodiments of the present disclosure.

An EM channel can operate at close range and can be used to initiate an upload of data, for example, telling the environmental sensing assembly to begin transmitting data via a wireless communicator and/or antenna to a remote reader's wireless communicator 312-R (e.g., via its antenna). In such embodiments, the remote reader device can receive and process the data using its logic circuit 302-R. Assemblies can also be designed to transmit processed data to a remote reader device 360 via a wireless hub, in some embodiments.

The system 340 can include one or more computing devices 370. The computing device 370 can include a logic circuit 302-C, program and/or data memory 304/306-C, a wireless communicator 312-C, and a physical contact point (e.g., a physical communication port) 316-C. As used herein, the designator "C" indicates a component associated with the computing device 370.

The computing device 370 can be remote to the remote reader device 360 and/or to a number of environmental sensing assemblies. The computing device 370 can include a physical communication port that corresponds to a physical communication port of the remote reader device. In one or more embodiments, the computing device 370 can include a driver to download data from the remote reader device 360.

In one or more embodiments, the computing device 370 can be a personal computer, a laptop computer, a server, and/or a dedicated database computer, among other computing devices. The computing device 370 can include a processor (e.g., logic circuit 302-C), memory (e.g., program and/or data memory 304/306-C), and instructions stored in the memory and executable by the processor to analyze the data from the remote reader device 360.

As remote reader devices gather the data from environmental sensing assemblies, the readers, in turn, can communicate the data and/or files to computing devices (e.g., databases and/or other storage locations). In some embodiments, this can be accomplished via another type of data device. For example, the system 340 can include a standalone gateway, hub, router, and/or other type of computing device, such as a personal computer, portable computing device, or server type computing device.

These devices can communicate with remote reader devices by way of wired and/or wireless interfaces, including Internet and/or other connection types. Through these connections, environmental data and/or assembly identifiers can be forwarded to one or more computing devices for storage and/or analysis, among other functions.

In such embodiments, a gateway or hub device can be situated, for example, in a warehouse, on a pier, or in an industrial area and perform its function without utilizing additional local information technology infrastructure. This can represent added value, for example, for users who do not wish to upgrade their existing computer and IT equipment.

Embodiments including computing devices 370 and remote reader devices 360 can be useful for providing a snapshot of environmental data sensed by a number of environmental sensing assemblies to a shipping technician operating a remote reader device 360, for example. The computing device 370 can be useful for performing a more in-depth analysis of the environmental data (e.g., by food scientists). Embodiments are not limited to these examples.

One or more embodiments including multiple groups can be useful in helping to segregate sensed environmental data into groups. For example, each group may represent environmental sensing assemblies that have gone through different supply chains, possibly exposed to different environmental conditions. According to one or more embodiments of the present disclosure, one, or a few, remote reader devices 360 can be used to collect environmental data from the groups. The groups, including environmental sensing assembly identifiers, possibly including assembly identifiers appended with a group identifier, can be beneficial in segregating data by group, for example, so that a user can associate various indicated alerts, or other environmental data, with an appropriate group (e.g., assemblies in the same transport vehicle or container).

Using one, or few, remote reader devices to collect environmental data from a number of groups of environmental sensing assemblies can be beneficial in helping to reduce work time and to control costs for shipping/receiving entities. For example, one remote reader device could be used to wirelessly gather environmental data from a number of groups of environmental sensing assemblies in range at one time. Such efficiency can reduce person-hours as well as costs associated with using multiple readers and/or using a single reader separately for each group.

Figure 4A:
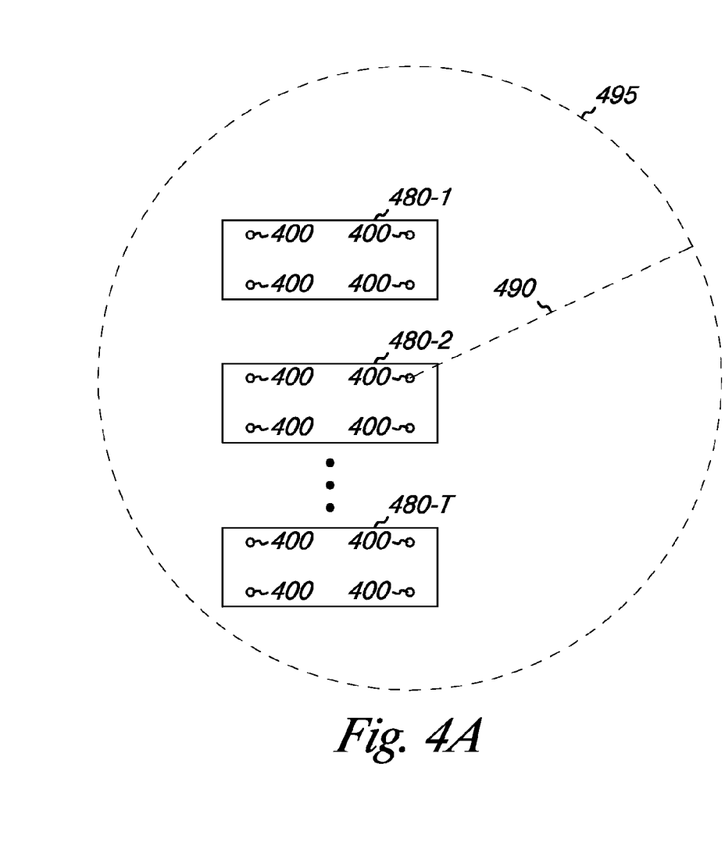
FIG. 4A is a block diagram illustrating a number of environmental sensing assemblies prior to formation of a group according to one or more embodiments of the present disclosure.

FIG. 4A is a block diagram illustrating a number of environmental sensing assemblies prior to formation of a group according to one or more embodiments of the present disclosure. An illustration of the range of a wireless communicator associated with an assembly 400 in environment 480-2 is illustrated by radius 490. Accordingly, circumferential area 495 illustrates an area in which assembly 400 can communicate with other devices such as other environmental sensing assemblies, remote reader devices, etc. In the example scenario illustrated in FIG. 4A, each environmental sensing assembly 400 in each environment 480-1, 480-2, . . . , 480-T is within range of assembly 400.

Four environmental sensing assemblies 400 are illustrated in each of a number of environments for sensing (e.g., trucks) 480-1, 480-2, . . . , 480-T. The scenario illustrated in FIG. 4A can represent a loading area (e.g., dock, freighter, etc.) with a number of environments (e.g., trucks, shipping containers, crates, etc.) 480-1, 480-2, . . . , 480-T. As goods (e.g., environmentally sensitive products) are loaded into the environments 480-1, 480-2, . . . , 480-T, a number of environmental sensing assemblies 400 can be activated. After activation, the assemblies 400 can begin sensing and storing environmental data, as well as communicating with other assemblies. For example, the assemblies 400 can transmit an assembly identifier and/or environmental data.

As described herein, a logic circuit associated with an assembly 400 can determine a group to include those electronic assemblies 400 from which transmissions are received for a period of time. In some embodiments, the period of time may be greater than two hours, although embodiments are not limited to a particular period of time. The period of time can, for example, begin running with activation of one or more environmental sensing assemblies 400.

Figure 4B:
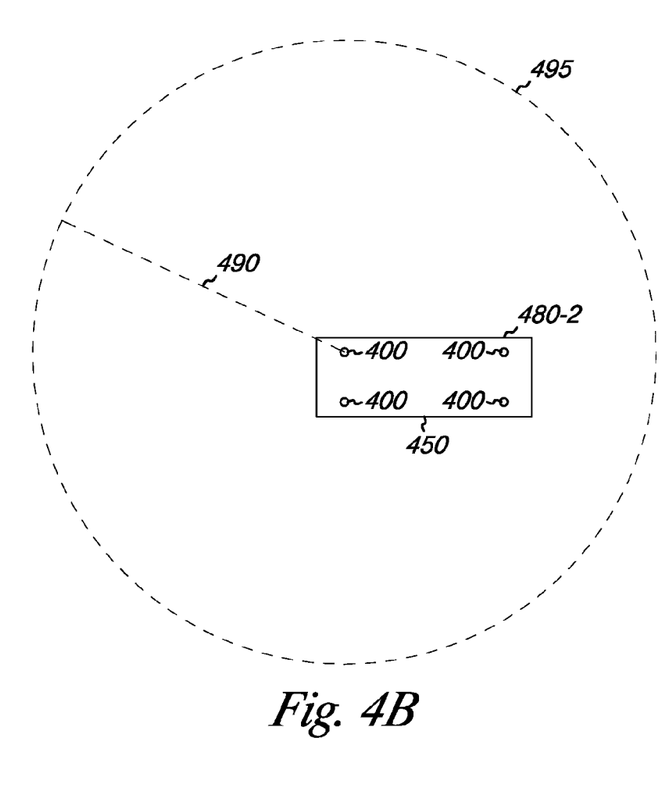
FIG. 4B is a block diagram illustrating a number of environmental sensing assemblies after formation of a group according to one or more embodiments of the present disclosure.

For example, one or more assemblies 400 to be loaded into one or more environments for sensing (e.g., along with environmentally sensitive products) and activated. The period of time can allow for the one or more environments to disperse into various shipping routes so that groups do not form between assemblies associated with different shipping routes, for example. An example of such is illustrated in FIG. 4B.

As described herein, the period of time can be user programmable. Such embodiments can be useful to allow different users to set different periods according to their shipping needs. For example, a particular user may have certain periods of time between loading and shipping associated with their industry.

Accordingly, the particular user may wish to program the certain period of time into their assemblies to allow sufficient delay for group formation. For example, if the manufacturing facility or the user knows that it typically takes four hours to leave a loading dock after product has been loaded, they may wish to program a period of time that is four hours or longer into the appropriate assemblies.

Likewise, a particular user may have different load/ship times during different shipping seasons (e.g., holiday rush). It is appreciated other scenarios and benefits that can be had by use of programmable periods of time for group formation.

In some embodiments, one or more logic circuits associated with environmental sensing assemblies can detect a group based on when it is receiving transmissions from a particular number, greater than a particular number, or less than a particular number of other assemblies. For example, a particular user may use a certain number of environmental sensing assemblies (e.g., four) with each environment (e.g., shipment), and may program their assemblies to form a group when the assemblies are receiving transmissions from the certain number (e.g., four) of other assemblies. Alternatively, the assemblies can be programmed such that they form a group when receiving transmissions from less than five other assemblies (e.g., an assembly may receive transmissions from a larger number of assemblies while in a shipping warehouse, but after departure may only receive transmissions from those assemblies within the same shipping container).

In one or more embodiments, a group can be defined based on a combination of an elapsed period of time and a particular number of assemblies from which transmissions are received. For example, a user could program a typical ship/load time of two hours as the period of time.

The user could also program "less than five" as a condition for group formation (e.g., if the user typically uses four assemblies per shipment). Accordingly, a group of environmental sensing assemblies can be formed at least two hours after activation (e.g., at loading), when the assemblies are receiving transmissions from fewer than five other assemblies. Embodiments are not limited to the specific examples given herein.

In some embodiments, once a group of environmental sensing assemblies has been formed, the assemblies contained therein will not accept data transmitted from assemblies that are not in the group. Such embodiments can be useful in preventing data corruption for the group. For example, such embodiments can help prevent a group from recording environmental data transmitted by assemblies that are not part of the group, but come within transmission range of the group at some point during shipment (e.g., trucks at a truck stop or in a convoy).

FIG. 4B is a block diagram illustrating a number of environmental sensing assemblies after formation of a group according to one or more embodiments of the present disclosure. Environment 480-2 from FIG. 4A is illustrated out of range 490 of other environments containing assemblies 400. FIG. 4B can reflect a status of environment 480-2 after the period of time has elapsed.

Accordingly, environmental sensing assembly 400-L has been assigned leader of group 450. Group 450 has been determined to include those assemblies 400 from which transmissions are received for the period of time (e.g., received by assembly 400-L). As will be appreciated, the group 450 can include those assemblies 400 that are within range 490 of a particular other assembly, e.g., assembly 400-L. In the example illustrated in FIG. 4B, the assemblies 400 of the group 450 are located within a same environment 480-2 (e.g., a same shipping container).

A remote reader device (e.g., remote reader device 360 illustrated in FIG. 3) can download data from the group (e.g., from the leader 400-L, which can receive, store, and/or transmit environmental data for each assembly 400 in the group 450) while the environment 480-2 (e.g., shipping container) remains sealed. As described herein, such data can be communicated wirelessly (e.g., using one or more wireless communicators).

Such embodiments can be useful for making a determination of whether to accept a particular shipment. For example, a shipping technician can use a remote reader device to download environmental data from a group leader 400-L.

Such data can indicate whether the environment 480-2 has been preserved according to a specification for the environmentally sensitive products contained within the environment. The ability to make such a determination without contacting or breaking a seal of an environment (e.g., shipping container) can reduce liability for shipments of spoiled goods, for example. A copending, commonly assigned U.S. patent application Ser. No. 12/255,322, having at least one inventor in common, entitled "Environmental Data Collection," having describes a number of methods of displaying such environmental data on a remote reader device such that an individual (e.g., a shipping technician) can quickly make a determination as to the quality of a shipment of environmentally sensitive products.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the disclosure includes various other applications in which the above structures and methods are used. Therefore, the scope of various embodiments of the disclosure should be determined with reference to the appended claims, along with the full range of equivalents to which such claims are entitled.

Additionally, in reading this disclosure and claims, it should be noted that the indefinite article "a" or "an", as it is used herein, is not intended to limit the number of elements to one. Accordingly, the terms "a" and "an" should be viewed as meaning one or more unless such limitation is expressly stated or such meaning would be illogical based upon the arrangement of elements formed by such meaning. Further, the term "a number of" should be interpreted as meaning one or more.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. An electronic assembly, comprising:
    a wireless communicator;
    a logic circuit coupled to the wireless communicator, wherein the logic circuit is configured to:
        communicate via the wireless communicator with particular other electronic assemblies equipped to sense one or more changes in an environmental condition; and
        automatically acquire assembly identifiers of the particular other electronic assemblies, equipped to sense one or more changes in an environmental condition, and
    a port for electromagnetic communication or physical contact and electrical communication with a remote reader device, wherein the port is coupled to the logical circuit to provide power from the remote reader device to the logic circuit.

2. The assembly of claim 1, wherein the electronic assembly further includes one or more environmental sensors coupled to the logic circuit; and
    wherein the logic circuit is further configured to transmit an assembly identifier for the electronic assembly, equipped to sense one or more changes in an environmental condition, via the wireless communicator.

3. The assembly of claim 2, wherein the logic circuit is configured to communicate time-stamped environmental data with the particular other electronic assemblies, equipped to sense one or more changes in an environmental condition, and to a remote reader device via the wireless communicator.

4. The assembly of claim 3, wherein the logic circuit is configured to enter a sleep mode after communicating the time-stamped environmental data to the remote reader device.

5. The assembly of claim 2, wherein the logic circuit is configured to initiate an alarm status when a calculated alarm event occurs based upon the measured time and measured environmental data or received environmental data.

6. The assembly of claim 5, wherein the logic circuit is configured to communicate the alarm status to a remote reader device via the wireless communicator.

7. The assembly of claim 1, wherein the logic circuit is configured to:
    receive time-stamped environmental data along with a different assembly identifier from each of the particular other electronic assemblies via the wireless communicator;
    append an assembly group identifier to the different assembly identifiers; and
    store the received time-stamped environmental data in a memory along with the appended different assembly identifiers.

8. The assembly of claim 1, wherein the assembly includes a protective cover at least partially surrounding the wireless communicator and the logic circuit.

9. The assembly of claim 8, wherein an adhesive graphic label is fitted over the protective cover.

10. The assembly of claim 1, wherein:
    the assembly includes one or more light emitting diodes (LEDs) that, when illuminated, are visible from an exterior of the assembly; and
    the assembly includes a pushbutton momentary switch configured to activate the assembly.

11. An environmental sensing and communication system, comprising:
    a plurality of electronic assemblies, equipped to sense one or more changes in an environmental condition, each electronic assembly including a logic circuit coupled to one or more environmental sensors, a wireless communicator, and a port for electromagnetic communication or physical contact and electrical communication with a remote reader device, wherein the port is coupled to the logic circuit to provide power from the remote reader device to the logic circuit, and wherein the logic circuit is encoded with an assembly identifier and configured to:

periodically transmit time-stamped environmental data via the wireless communicator along with the assembly identifier; and determine a group to include those electronic assemblies, equipped to sense one or more changes in an environmental condition, from which transmissions are received for a period of time.

12. The system of claim 11, wherein:
a number of the plurality of electronic assemblies include memory; and
the logic circuit of each of the number of the plurality of electronic assemblies is configured to store time-stamped environmental data in the memory.

13. The system of claim 11, wherein one of the plurality of electronic assemblies in the group is assigned as a leader for the group.

14. The system of claim 13, wherein the logic circuit is configured to store, when assigned as the leader, time-stamped environmental data and the assembly identifiers received from each electronic assembly of the group in the memory.

15. The system of claim 14, wherein the logic circuit is configured to append a group identifier to the assembly identifiers received from each electronic assembly.

16. The system of claim 15, wherein:
the system includes a reader device, wherein the reader device is configured to transmit a download request signal and to wirelessly download data from the group of electronic assemblies; and
the logic circuit is configured to transmit, when assigned as the leader, the time-stamped environmental data along with the appended assembly identifiers from the memory to the reader device via the wireless communicator upon receipt of the download request signal.

17. The system of claim 16, wherein:
the system includes more than one group;
each group is located within a different shipping container within communication range of the reader device; and
the reader is configured to segregate the time-stamped environmental data for each group according to the appended assembly identifiers.

18. The system of claim 11, wherein the system includes a reader device including:
a wireless communicator to download data from the group of electronic assemblies; and
a physical communication port including a driver to transmit data.

19. A method of environmental sensing and communication, comprising:
collecting environmental data with a group of environmental sensing assemblies;
wirelessly communicating environmental sensing assembly identifiers and environmental data collected by the environmental sensing assemblies between the environmental sensing assemblies of the group;
assigning one of the environmental sensing assemblies of the group as a leader for the group;
electromagnetically communicating or physically contacting and electrically communicating between a port of a particular one of the group of environmental sensing assemblies and a remote reader device; and
providing power from the remote reader device to the particular environmental sensing assembly.

20. The method of claim 19, wherein the method includes storing the environmental data, collected by each environmental sensing assembly of the group, in memory of the leader.

21. The method of claim 20, wherein storing the environmental data in memory of the leader includes storing the environmental data along with a corresponding environmental sensing assembly identifier for each environmental sensing assembly of the group.

22. The method of claim 19, wherein assigning the leader includes assigning the leader by a method selected from the group including:
randomly assigning one of the environmental sensing assemblies as the leader;
assigning one of the environmental sensing assemblies as the leader based on which assembly identifier meets one or more particular criteria with respect to other assembly identifiers;
assigning one of the environmental sensing assemblies as the leader based on which environmental sensing assembly has been active for the greatest amount time; and
assigning one of the environmental sensing assemblies as the leader based on which environmental sensing assembly has been active for the least amount of time.

23. The method of claim 19, including wirelessly communicating the environmental data from the leader to a reader device.

24. An electronic assembly, comprising:
a wireless communicator;
a logic circuit coupled to the wireless communicator, wherein the logic circuit is configured to communicate with particular other electronic assemblies equipped to sense one or more changes in an environmental condition via the wireless communicator;
a power source that provides power to at least one of the logic circuit and the wireless communicator; and
a port for physical contact and electrical communication with a remote reader device, wherein the port is coupled to the power source to provide power from the remote reader device to the power source.

25. The assembly of claim 24, wherein the electronic assembly further includes one or more environmental sensors coupled to the logic circuit.

26. The assembly of claim 24, wherein the port is coupled to the logic circuit and configured to provide communication of time stamped environmental data from the memory to the remote reader device.

* * * * *